(12) United States Patent
Eisser et al.

(10) Patent No.: US 10,220,415 B2
(45) Date of Patent: Mar. 5, 2019

(54) TRUCK, LOADING BRIDGE, SORTING SYSTEM FOR ITEMS BEING DISPATCHED AND RETROFIT KIT FOR A SORTING MACHINE FOR ITEMS BEING DISPATCHED

(71) Applicant: SIEMENS AKTIENGESELLSCHAFT, Munich (DE)

(72) Inventors: Dirk-Udo Eisser, Reichenau (DE); Wolf-Stephan Wilke, Constance (DE); Armin Zimmermann, Constance (DE)

(73) Assignee: Siemens Aktiengesellschaft, Munich (DE)

( * ) Notice: Subject to any disclaimer, the term of this patent is extended or adjusted under 35 U.S.C. 154(b) by 133 days.

(21) Appl. No.: 15/504,344

(22) PCT Filed: Jul. 28, 2015

(86) PCT No.: PCT/EP2015/067288
§ 371 (c)(1),
(2) Date: Feb. 16, 2017

(87) PCT Pub. No.: WO2016/026658
PCT Pub. Date: Feb. 25, 2016

(65) Prior Publication Data
US 2017/0232477 A1     Aug. 17, 2017

(30) Foreign Application Priority Data
Aug. 22, 2014   (DE) .................. 10 2014 216 734

(51) Int. Cl.
*B07C 3/00*   (2006.01)
*B65G 15/00*  (2006.01)

(52) U.S. Cl.
CPC .............. *B07C 3/008* (2013.01); *B65G 15/00* (2013.01)

(58) Field of Classification Search
CPC .......... B07C 3/008; B07C 3/082; B07C 3/02; B65G 15/00; B65G 65/00; B65G 1/0435; B65G 2201/022; B65G 2201/0285; B62B 2203/10; Y10S 209/90; Y10S 209/912;
(Continued)

(56) References Cited

U.S. PATENT DOCUMENTS 3,817,516 A * 6/1974 Lazzarotti .............. B65H 1/025
271/150
4,512,562 A * 4/1985 Moll ...................... B65H 5/021
270/45

(Continued)

FOREIGN PATENT DOCUMENTS

| DE | 102011077793 A1 | 3/2012 |
| EP | 2607277 A1 | 6/2013 |
| EP | 2547461 B1 | 5/2014 |

*Primary Examiner* — Glenn F Meyers
(74) *Attorney, Agent, or Firm* — Laurence Greenberg; Werner Stemer; Ralph Locher

(57) ABSTRACT

A truck, a loading bridge, a sorting system for items being dispatched and a retrofit kit for a sorting machine for items being dispatched. In order to ensure that an item being dispatched can be removed in simple ways from the sorting machine for items being dispatched and transported to a further sorting step, the truck has a displaceable floor and the loading bridge has a driving device for the floor.

5 Claims, 5 Drawing Sheets

(58) Field of Classification Search
CPC . B65H 5/021; B65H 29/00; G05D 2201/0216
USPC .................................. 414/331.09, 593, 265
See application file for complete search history.

(56) References Cited

U.S. PATENT DOCUMENTS

| | | | | |
|---|---|---|---|---|
| 5,096,354 | A * | 3/1992 | Wu | B61C 11/04 |
| | | | | 414/265 |
| 5,803,704 | A * | 9/1998 | Lazzarotti | B07C 1/025 |
| | | | | 414/218 |
| 8,695,808 | B2 | 4/2014 | Cartal et al. | |
| 2007/0020067 | A1* | 1/2007 | Lin | B65G 1/023 |
| | | | | 414/331.09 |
| 2010/0296902 | A1* | 11/2010 | Aschpurwis | B60P 1/365 |
| | | | | 414/499 |
| 2011/0150622 | A1* | 6/2011 | Schwarz | B62B 3/04 |
| | | | | 414/800 |

* cited by examiner

TRUCK, LOADING BRIDGE, SORTING SYSTEM FOR ITEMS BEING DISPATCHED AND RETROFIT KIT FOR A SORTING MACHINE FOR ITEMS BEING DISPATCHED

Truck, loading bridge, sorting system for items being dispatched and retrofit kit for a sorting machine for items being dispatched

BACKGROUND OF THE INVENTION

Field of the Invention

The present invention relates to a truck for transporting items being dispatched, with several receptacles arranged one above the other for the acceptance of items being dispatched by a sorting machine for items being dispatched. Furthermore, the invention relates to a loading bridge for loading items being dispatched from a sorting machine for items being dispatched to a truck. Furthermore, the invention relates to a sorting system for items being dispatched with a sorting machine for items being dispatched. In addition, the invention relates to a retrofit kit for a sorting machine for items being dispatched.

The trucks, loading bridges and sorting systems for items being dispatched with a sorting machine for items being dispatched or a further processing machine are commonly known. The sorting machines for items being dispatched are used to sort items being dispatched, for example, letters, parcels and packages, for their delivery. The items being dispatched are sorted by the sorting machine for items being dispatched into compartments representing destinations. In order to be able to assign the item being dispatched for delivery it may be necessary to sort the item being dispatched several times. The item being dispatched is, for example, sorted in accordance with the radix sort method and for this purpose it is sorted several times by the sorting machine for items being dispatched.

In order to be able to transport items being dispatched from the sorting compartments back to an inlet of the sorting machine for items being dispatched or to another processing machine, trucks with several receptacles arranged one above the other are known. Such a truck is disclosed in DE 10 2011 077 793 A1.

Manual loading of the item being dispatched sorted at least once from the sorting machine for items being dispatched into the truck is difficult, however.

SUMMARY OF THE INVENTION

The object is therefore to provide a truck, a loading bridge, a sorting system for items being dispatched and a retrofit kit for a sorting machine for items being dispatched with which the sorted item being dispatched is easier to handle.

According to the invention, a truck of the aforementioned type is made available, wherein at least one of the receptacles has a displaceable floor. Furthermore, according to the invention a sorting system for items being dispatched of the aforementioned type is provided which has a truck according to the invention. In addition, according to the invention a retrofit kit of the aforementioned type is provided which has a truck according to the invention.

When loading the receptacle and when loading further items being dispatched into the receptacle, the item being dispatched in the receptacle need no longer be displaced over the floor. Rather, the item being dispatched can be moved using the displaceable floor of the receptacle in the container. Friction forces between the item being dispatched and the floor impeding loading are reduced as a result.

Further, according to the invention a loading bridge of the aforementioned type is provided, wherein the loading bridge has a driving device which is arranged on an unloading side of the loading bridge. The floor of the receptacle can be displaced with the aid of the driving device, whereby loading or reloading of the transport container is further simplified.

The solution according to the invention can be further improved by means of various individually advantageous and, insofar as not embodied otherwise, arbitrarily combinable embodiments. These embodiments and the advantages associated with them are discussed in more detail hereinafter.

The floor can thus be displaced along a feed direction in which the item being dispatched can be moved into the receptacle. As a result of the floor being displaceable along the feed direction, the item being dispatched can be simply transferred into the receptacle in a linear movement, without the direction of movement of the item being dispatched being altered.

Preferably, the truck has a motion-transmitting output drive device connected to the floor. The output drive device can be designed to absorb a force and to forward this to the floor to move it, dispensing with the need to move the floor manually.

For example, the driving device of the loading bridge can be designed to introduce a movement into the output drive device of the truck.

Alternatively, the truck may have a drive, for example, an electric motor, with which the floor of the at least one receptacle can be displaced. However, such a motor would increase the weight of the truck. In particular, if all the floors of the receptacle were displaceable in design and if a motor were to be provided for each of the floors, the weight of the truck would be increased so much that it would be more difficult to manage the truck.

The output drive device is therefore preferably designed to absorb and transfer a mechanical movement to the floor so that no energy converters, for example, to convert electrical energy into kinetic energy, need be accommodated in the truck to move the floor.

In a particularly advantageous exemplary embodiment, due to its simplicity, the floor is formed by a transport or conveyor belt. In particular, a side of the conveyor belt pointing to the inside of the receptacle forms its floor. The output drive device is preferably connected to a roller of the conveyor belt to enable the transfer of movement.

The driving device of the loading bridge can initiate a rotational movement in the output drive device, wherein the output drive device converts the rotational movement as a linear movement of the section of the transport belt pointing to the inside of the receptacle. For example, the driving and output drive devices can each be designed as gears or toothed rollers which contact one another during operation in order to displace the floor. In particular, the driving device can be designed as a friction wheel applicable to the conveyor belt, the rotation of which drives the conveyor belt during operation. In this case, the conveyor belt, together with the roller, forms the output drive device. The driving device can be held against the output drive device manually by an operator to enable the transfer of movement.

The loading bridge may have a pivotable bridging flap on its unloading side which extends a loading area of the loading bridge in its operational position. In particular, the loading area can be extended so far by the bridging flap when loading the item being dispatched that there is no gap between the loading bridge and the truck into which the item being dispatched, for example, a letter, could fall. Preferably, the bridging flap is supported on the floor of the receptacle during loading so that minor incorrect positioning of the truck in relation to the loading bridge does not lead to a gap. In its operational position, preferably the bridging flap essentially aligns with the loading area and projects parallel to the loading area beyond other elements of the loading bridge.

Furthermore, in its operational position the bridging flap may be arranged above the driving device, even if the driving device is in contact with the output drive device of the truck. A collision of the item being dispatched which is to be loaded with the driving device or the output drive device is thus reliably prevented. The item being dispatched can therefore simply be pushed from the loading area over the bridging flap onto the movable floor of the receptacle. During loading or reloading, the floor moves the item being dispatched in the feed direction so that only the item being dispatched on the loading bridge must be displaced. The item being dispatched in the receptacle need not be moved manually, thus simplifying the handling of the item being dispatched.

In addition, the loading area can also be displaceable and, for example, formed by a conveyor belt which can be moved through the driving device.

The receptacle may have at least one stack support and in particular, at least two stack supports which prevent tilting of the item being dispatched in the receptacle. The stack supports can be arranged in the feed direction before and/or after the item being dispatched, where possible vertically positioned. If the item being dispatched is moved by the displaceable floor inside the receptacle, the at least one stack support follows this movement. For example, the at least one stack support can be displaceably arranged along the feed direction so that the motive force from the item being dispatched acting on the stack support displaces the stack support. Alternatively, the stack support can be connected to the displaceable floor to transfer movement regardless of the item being dispatched. The stack supports can be pivotable around a swivel axis in the feed direction in the receptacle. If there are several stack supports, these may be displaceable relative to one another parallel to the feed direction in order to be able to arrange a different number of items being dispatched between two stack supports. Alternatively, stack supports may also be referred to as cutting knives.

The loading bridge can also have at least one stack support. The at least one stack support of the loading bridge is preferably mounted on the unloading side of the loading bridge. This stack support prevents an item being dispatched which is to be moved on the truck from falling from the loading bridge.

In order to enable an item being dispatched on the loading bridge to not only be transferred into one of the receptacles, but into all of the receptacles, the receptacles can be held height-adjustably by the truck. In particular, the height of each of the receptacles can be adjusted so that the floor of the receptacle concerned is essentially arranged at the same height as the loading area of the loading bridge, with manual or mechanical adjustment of the height of the receptacle possible. In particular, however, if many or heavy items being dispatched are to be arranged in the receptacles, manual adjustment of the position of the receptacle of the item being dispatched is difficult. Preferably, the truck therefore has at least one drive, for example, an electric motor, with the aid of which the height of the receptacle can be adjusted, for example, by a belt drive or a spindle drive. All the receptacles simultaneously or individual or selected receptacles can be moved in parallel to the height direction.

In order to prevent the truck from tipping over, in particular if the receptacles are filled or in a high position, the truck may have an anti-tilt lock. The anti-tilt lock is, for example, designed to hold the truck in a fixture arranged in the floor on which the truck is standing. For example, the anti-tilt lock has a bayonet lock.

In order to be able to mount the loading bridge on the sorting machine for items being dispatched, on its loading side the loading bridge preferably has an assembly device for assembly on the sorting machine for items being dispatched. When the loading bridge is in an assembled state, the loading side points to and the unloading side away from the sorting machine for items being dispatched.

In particular, if the loading bridge is part of the retrofit kit, the loading bridge can be provided as an adapter between the sorting machine for items being dispatched and the truck. The loading bridge can be simply mounted on the sorting machine for items being dispatched by means of the assembly device.

The assembly device may have part of a linear guide or linear bearing which enables the guided movement of the loading bridge along the sorting machine for items being dispatched. For example, the linear guide may be a linear bearing. Part of the linear guide can be attachable to the sorting machine for items being dispatched. A further part of the linear guide is preferably an integral component of the loading bridge. The linear guide may, for example, have a ball bearing or a roller bearing, enabling the loading bridge to be moved along the sorting machine for items being dispatched with the minimum of effort. Furthermore, the loading bridge can be displaced with mechanical assistance, in other words by a motor, along the sorting machine for items being dispatched.

In order to prevent deformation of the loading bridge by the weight of the item being dispatched when loading the item being dispatched, in addition to the assembly device the loading bridge can be supported on the sorting machine for items being dispatched. In particular, the assembly device can be arranged in an upper area of the loading bridge. In a lower area of the loading bridge, it can be supported on the sorting machine for items being dispatched. Preferably, the loading bridge has a pulley or a wheel by way of which the loading bridge is supported on the sorting machine for items being dispatched and which rolls over the sorting machine for items being dispatched when the loading bridge is pushed along the sorting machine for items being dispatched.

In order for the motor altering the position of the receptacle in the height direction to be supplied with energy and in particular, with electric current, the truck can have a battery and, for example, a rechargeable battery. In order to save the additional weight of the battery, however, the truck preferably has at least one plug via which energy and for example, control or data signals can also be supplied to the motor. The loading bridge may have a mating connector for the plug of the truck.

The at least one plug is, for example, at one end of the truck contrary to the feed direction. In addition, or alternatively, the truck may have a plug which is at an end pointing in the feed direction of the truck. If the truck has at least one plug at its end contrary to the feed direction as well as at its end pointing in the feed direction respectively, the truck is simply contactable in and contrary to the feed direction and can be flexibly employed.

For example, at its inlet for items being dispatched the sorting machine for items being dispatched may have at least one plug to supply the truck with electrical energy and/or signals. Items being dispatched which have already been sorted can therefore be simply supplied to the sorting machine for items being dispatched from each of the receptacles for further sorting on the inlet side using the truck, wherein the receptacles of the truck are also then displaceable heightwise without further ado and for example, in a motorized manner, when the truck is connected on the inlet side transferring electrical energy and signals to the sorting machine for items being dispatched.

In addition, according to the invention a manual workplace, for example, a workstation, can be provided on which the item being dispatched can be handled further. For example, items being dispatched which cannot be mechanically sorted can be provided at the workplace and sorted into items being dispatched on the truck.

The workplace can be used free standing, fastened to the sorting machine for items being dispatched or to another machine or to another object, for instance, a wall.

Furthermore, the workplace may have all or selected features of the loading bridge. As these features are already described in relation to the loading bridge, for the sake of brevity this description is not repeated in full in relation to the workplace.

In particular, the workplace may have at least one driving device and/or one bridging flap, wherein the driving device and the bridging flap may correspond to the driving device and the bridging flap of the loading bridge in structure and function. Moreover, like the loading bridge, the workplace may have connections, for example, plugs, which may form a plug connection with the plugs of the truck in order, for example, to supply the truck with electrical energy and/or signals, in particular control and/or data signals.

The plug of the truck can therefore be connected to the plug of the workplace at least contrary to the feed direction. In addition, or alternatively, if the truck has the at least one plug arranged at its end pointing in the feed direction, the loading carriage can also be connected to the workplace in the feed direction.

Each of the receptacles is therefore also readily accessible at the manual workplace in and/or contrary to the feed direction. Items being dispatched can therefore be added to each of the receptacles or removed from them, wherein the item being dispatched only needs to be moved horizontally, wherein the receptacles of the truck are also then displaceable heightwise without further ado and for example, in a motorized manner, when the truck is connected to the manual workplace transferring electrical power and signals.

Plugs and further electrical systems for assembly at the inlet for items being dispatched and/or the workplace may be part of the sorting system for items being dispatched and/or the retrofit kit.

The aforementioned properties, features and advantages of this invention and the manner in which these are achieved will become clearer and more easily understood in connection with the following description of the exemplary embodiments which are explained in more detail hereinafter with reference to the diagrams, in which:

DESCRIPTION OF THE INVENTION

Hereinafter, the invention is explained exemplarily with reference to the embodiments with regard to the diagrams.

The different features of the embodiments can be combined independently of each other, as already explained in the individual advantageous embodiments.

First, the structure and function of a truck according to the invention are described with reference to the exemplary embodiment of FIGS. 1 and 2.

Figure 1:
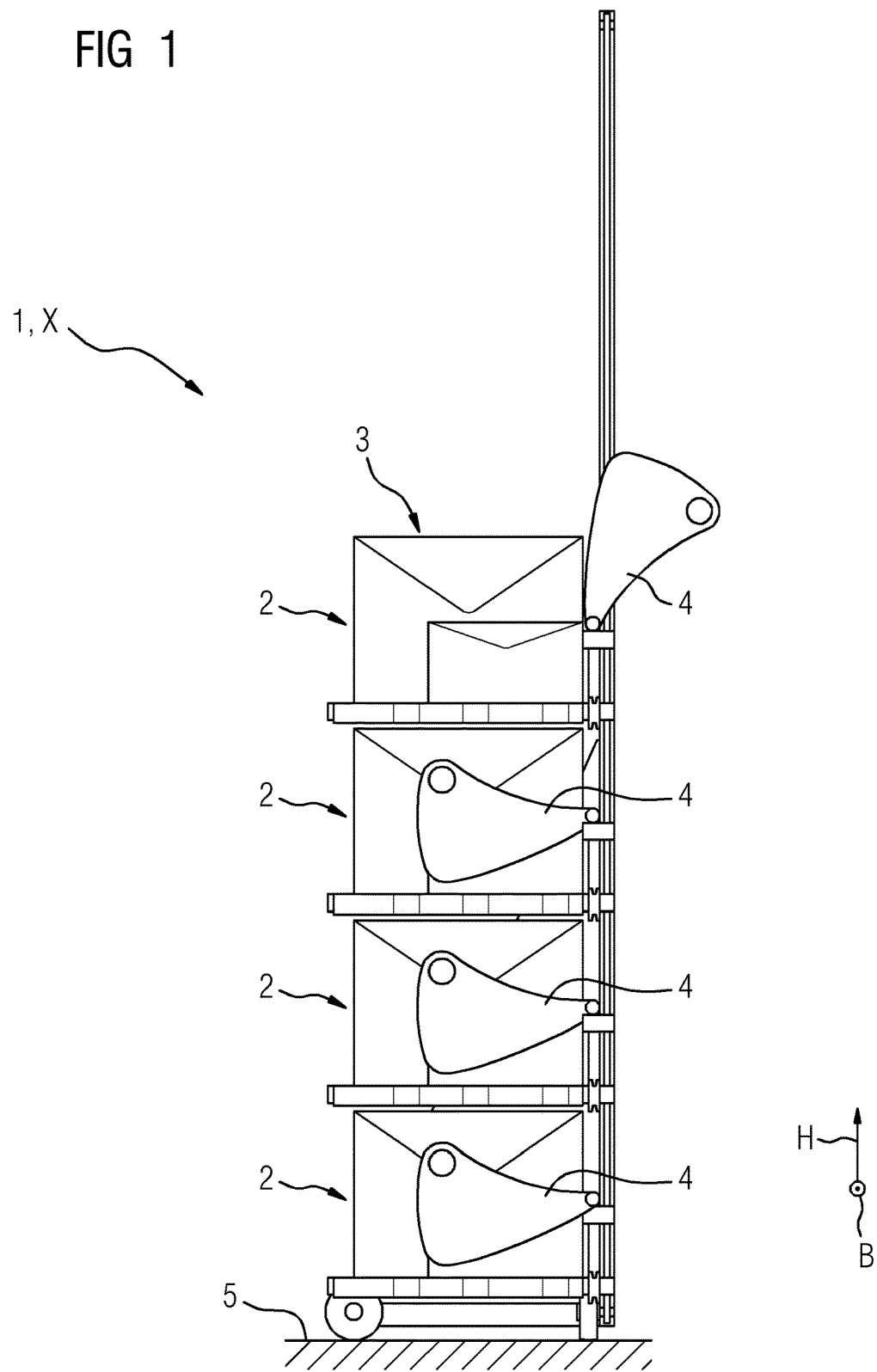
FIG. 1 shows a first exemplary embodiment of a truck according to the invention in a cut front elevation.

FIG. 1 shows a diagrammatic cut front view of the truck, wherein the section plane is perpendicular to a feed direction B in which the truck 1 can be loaded with items being dispatched.

According to the exemplary embodiment of FIG. 1, the truck 1 has four receptacles 2 each of which are loaded in the feed direction B with items being dispatched 3, for example, in the form of letters. Naturally, the truck 1 may also have more or fewer than the four receptacles 3 shown. In particular, the truck 1 may have two, three or more than four receptacles 3.

The receptacles 2 are arranged one above the other in a height direction H of the truck 1 in order to be able to provide as many items being dispatched 3 as possible in the receptacles 2 using as small a footprint of the truck 1 as possible.

For each of the receptacles 2, the truck 1 has at least one stack support 4 with which the tipping over of the item being dispatched 3 can be prevented. The stack support 4 can be pivoted around an axis parallel to the feed direction B in the respective receptacle 2 so that the stack support 4 is arranged in the feed direction B behind the items being dispatched 3. Furthermore, the truck 1 can have a second stack support 4 for at least one of the receptacles 2 which can likewise be pivoted around a swivel axis parallel to the feed direction B in the respective receptacle 2 so that the item being dispatched 3 is arranged between two stack supports 4 and secured to avoid tilting.

The receptacles 2 may be designed as receiving planes. Alternatively, the receptacles 2 may have side walls which are parallel to the feed direction B and which prevent the item being dispatched 3 from falling transversely to the feed direction B.

The truck 1 may be part of a retrofit kit X for a sorting machine for items being dispatched.

Figure 2:
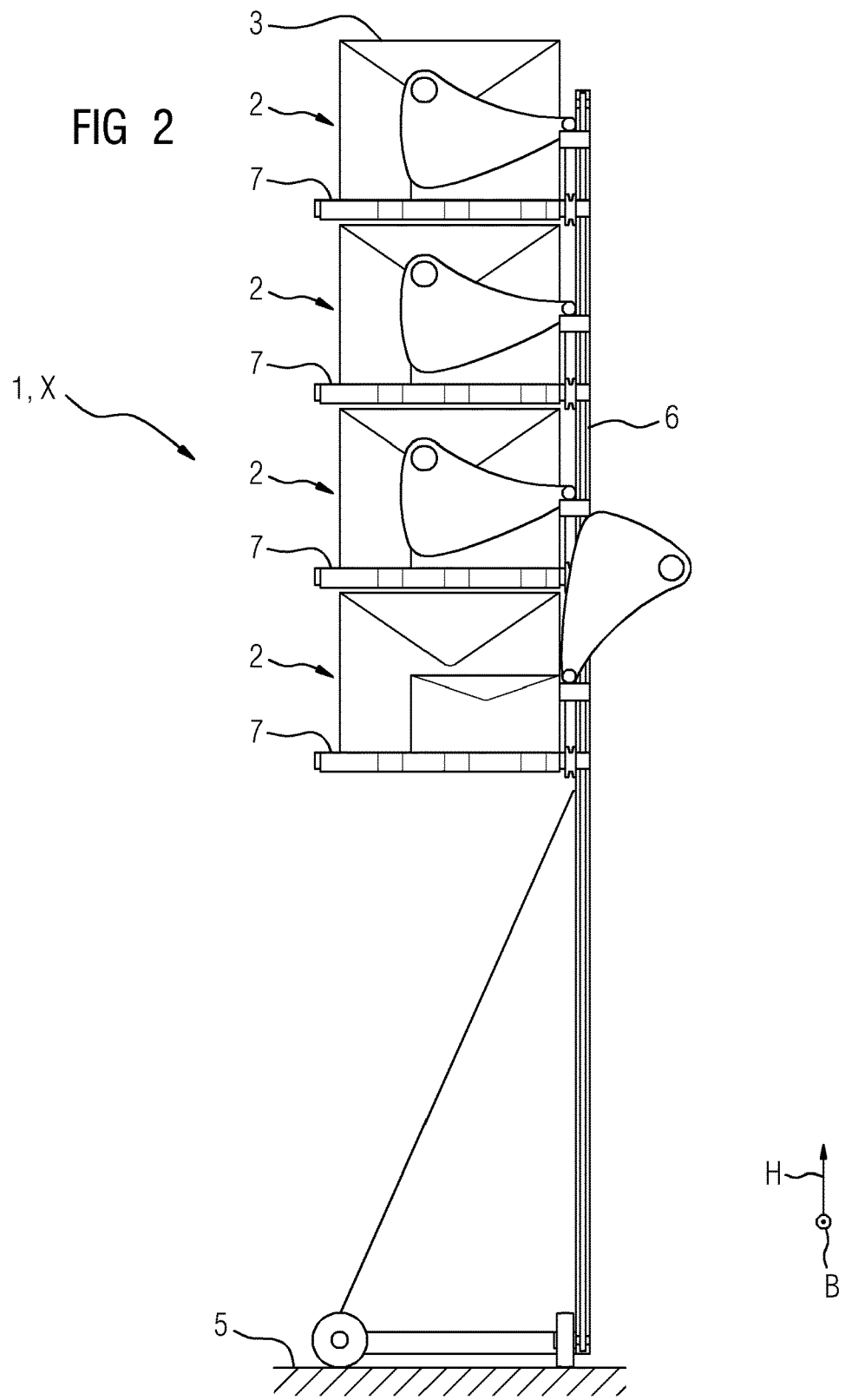
FIG. 2 shows the exemplary embodiment of FIG. 1 with receptacles arranged at a higher level.

FIG. 2 shows the exemplary embodiment of FIG. 1 diagrammatically in the cut front view, wherein the receptacles 2 in FIG. 2 are arranged in the height direction H further away from an installation area 5 of the truck 1 than in FIG. 1. The receptacles 2 can namely be held displaceably in the height direction H by the truck 1. For example, the truck 1 may have at least one holding or guide rod 6, along which the position of the receptacle 2 can be altered in the height direction H. The holding or guide rod 6 can guide the movement of the receptacle 2 parallel to the height direction H. The receptacles 2 are individually or jointly displaceable in the height direction H. For example, the receptacles 2 are connected to a toothed belt or a spindle in a motion-transmitting manner. The toothed belt or the spindle extends parallel to the height direction H. With its aid, the receptacles 2 can be moved parallel to the height direction H. The toothed belt and the spindle can be driven by a drive 6a, for example, a motor, for instance, an electric motor. If the receptacles 2 can be moved individually, they may be detachably connectable to the toothed belt or the spindle or a drive 6a can be provided for each of the receptacles 2.

In particular, the item being dispatched 3 stands on a floor 7 of the receptacle 2.

Figure 3:
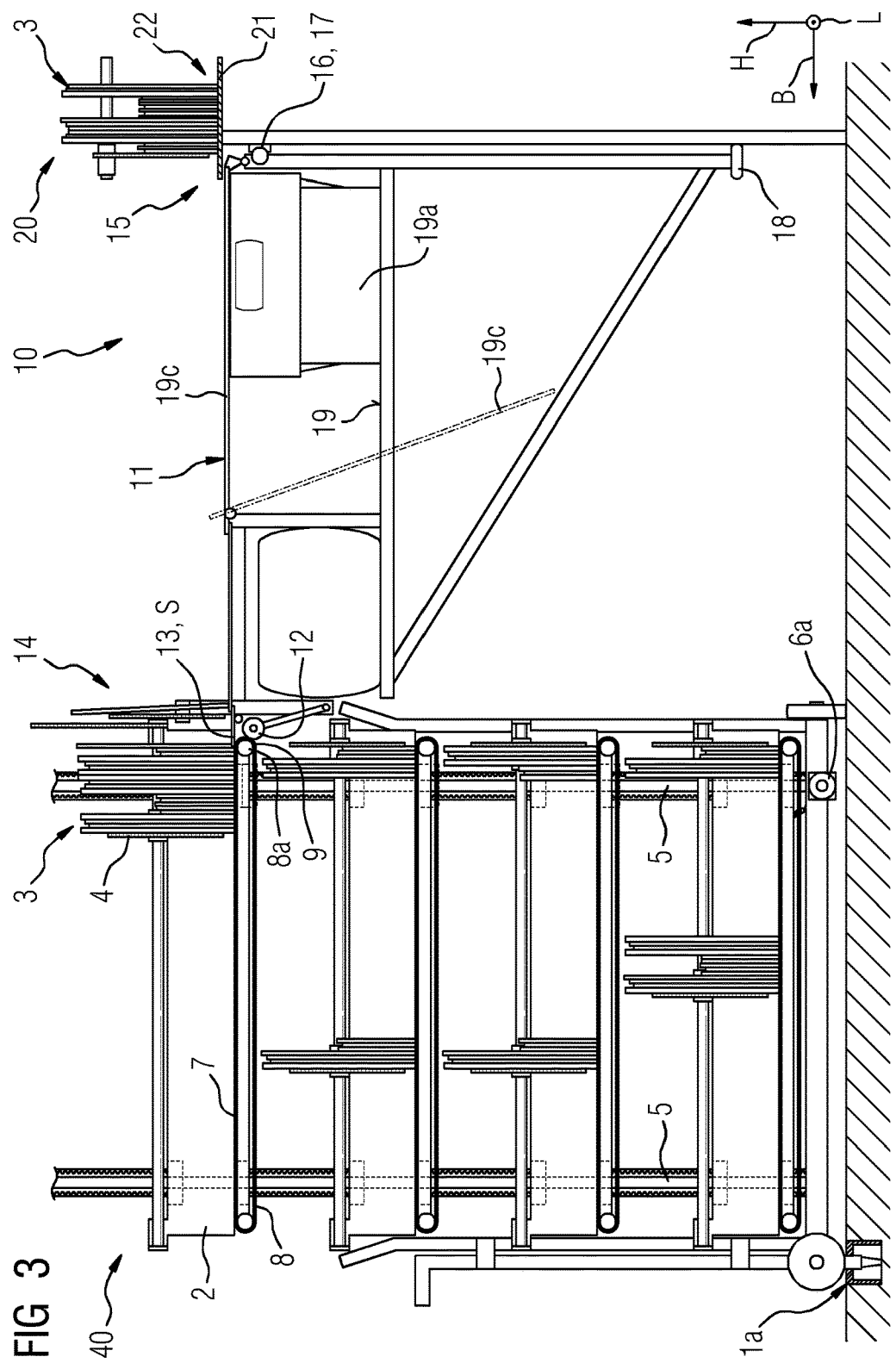
FIG. 3 shows the exemplary embodiment of the truck of FIGS. 1 and 2 and an exemplary embodiment of a loading bridge according to the invention.

FIG. 3 shows the exemplary embodiment of the truck 1 of FIGS. 1 and 2 in a side view together with a first exemplary embodiment of a loading bridge 10 which is attached to a sorting machine for items being dispatched 20.

In the exemplary embodiment of FIG. 3, the highest of the receptacles 2 is arranged in the height direction H such that its floor 7 is arranged with a loading area 11 of the loading bridge 10 at the same level as the floor 7.

If the floor 7 and the loading area 11 are arranged at the same height, the item being dispatched 3 can be brought without further ado from the loading bridge 10 into the receptacle 2 and in particular, pushed.

The item being dispatched 3 can simply be pushed onto the loading area 11 from the sorting machine for items being dispatched 20 if the loading area 11 is arranged at the same height in the height direction H as the floor 21 of a sorting compartment 22 of the sorting machine for items being dispatched 20. Consequently, the floor 7 of the receptacle 2, the loading area 11 of the loading bridge 10 and the floor 21 of the sorting compartment 22 of the sorting machine for items being dispatched 20 can be arranged next to each other in the height direction H so that the item being dispatched 2 can be simply pushed from the sorting compartment 22 via the loading area 11 of the loading bridge 10 into the receptacle 2 of the truck 1. Each of the receptacles 2 can be arranged at this height position and thus be loaded with ease.

In the exemplary embodiment of FIG. 3, items being dispatched 3 are already in the receptacle 2. Should items being dispatched 3 present in the sorting compartment 22 now be moved into the receptacle 2, not only the items being dispatched 3 to be newly put into the receptacle 2 would be pushed into it. Rather, the items being dispatched 3 already in the receptacle 2 would also have to be moved. As larger quantities of items being dispatched 3 weigh a considerable amount and can only be displaced with difficulty, the filling or refilling of the receptacle 2 would burden a user of the truck 1 and the loading bridge 10 in the long run. In order to simplify filling of the receptacle 2, the floor 7 of the receptacle 2 is displaceable in design. As a result of the floor 7 being displaceable in design, the items being dispatched 3 already in the receptacle 2 or to be newly put into it need no longer be moved across the floor 7. Rather, the floor 7 can move with the items being dispatched 3 so that frictional forces are prevented from arising between the items being dispatched 3 and the floor 7.

In the exemplary embodiment of FIG. 3, a section of a transport or conveyor belt 8 facing the inside of the receptacle 2 forms the floor 7, making the floor 7 movable without the floor 7 being moved out of the receptacle 2 as a result of its movement.

In order to be able to handle the item being dispatched 3 with ease, the stack support 4 of the truck 1 can move together with the floor 7. For example, the floor 7 and the stack support 4 can be connected to each other in a motion-transmitting manner. Alternatively, the movement of the item being dispatched 3 with the floor 7 can displace the stack support 4 in the feed direction B.

The truck 1 may have a driving device 9 which receives a drive torque and passes it on to the floor 7 to displace the latter. For example, the driving device 9 may have or be a gear. In a particularly simple embodiment, because it is simple to embody and to operate, the driving device 9 may consist of a pulley 8a for the conveyor belt 8 and the conveyor belt 8 itself.

In order to be able to initiate a drive torque in the conveyor belt 8 and thus the floor 7, the loading bridge 10 preferably has a driving device 12 which can be connected to the floor 7 in a motion-transmitting manner. In the exemplary embodiment of the FIG. 3, the driving device 12 is designed as a friction roller which can be applied and in particular, can be pressed, to the conveyor belt 8 adjacent to the pulley 8a. If the friction roller rotates, the frictional connection between the friction roller and the conveyor belt 8 transfers this rotational movement to the conveyor belt 8, making the floor 7 of the receptacle 2 move. In particular, the floor 7 moves parallel to the feed direction B. The driving device 12 and for example, the friction roller can be electrically driven or operable. With the creation of movement by the loading bridge 10, the truck 1 does not require drive motors for the floor 7 or even the floors 7 and in particular, for the conveyor belt 8 so that the truck 1 is not embodied with fewer.

If the truck 1 is loaded with a larger quantity of items being dispatched 3 and in particular, if at least one of the receptacles 2 is arranged in a higher position as shown in FIG. 2, the truck 1 may tip over. In order to prevent the truck 1 from tipping over, it may have an anti-tilt lock 1a which, for example, can be fastened to a fixture provided in the installation area 5.

In order to prevent a gap from forming between the truck 1 and the loading bridge 10 through which the items being dispatched 3 can fall, a bridging flap 13 can be provided which is in contact with the loading area 11 and the floor 7 in its operational position S and in particular, is supported at least on the floor 7. The bridging flap 13 can be attached to an unloading side 14 of the loading bridge 10 facing away from the sorting machine for items being dispatched 20 and for example, the loading area 11. With the bridging flap 13 in a neutral position, it can be parallel to the height direction H. To move the bridging flap 13 from the neutral position into the operational position S, this can simply be tiltable in the direction of the sorting machine for items being dispatched 20. If the bridging flap 13 is arranged on the truck 1 and for example, on the receptacle 2, the bridging flap 13 can be tilted out of the vertical neutral position in the direction of the sorting machine for items being dispatched 20 and in particular in the direction of the loading area 11.

The bridging flap 13 in particular covers the driving device 12 when this is connected to the driving device 9 in a motion-transmitting manner so that the moving parts of the driving device 12 and the driving device 9 cannot damage the item being dispatched 3 and do not constitute any risk for the operator of the sorting machine for items being dispatched 20.

On a loading side 15 of the loading bridge 10 pointing to the sorting machine 20 and opposite the unloading side 14 in the feed direction B, the loading bridge may have an assembly device 16 for assembly of the loading bridge 10 on the sorting machine for items being dispatched 20. The assembly device 16 may have a linear guide 17 with a bearing so that the loading bridge 10 can be moved along the sorting machine for items being dispatched 20 and in particular along a longitudinal direction L of the sorting machine for items being dispatched 20. The loading bridge 10 therefore need not necessarily be dimensioned such that it extends completely along the sorting machine for items being dispatched 20. Rather, the loading bridge 10 can be moved from a section of the sorting machine for items being dispatched 20 to another section of the sorting machine for items being dispatched 20 and, for example, pushed in order to empty various sorting compartments 20.

In order to prevent unwanted deformations of the loading bridge 10 and damage to the sorting machine for items being dispatched 20 by movement of the loading bridge 10, the latter may have a wheel or a pulley 18, wherein the loading bridge 10 is supported by the pulley 18 on the sorting machine for items being dispatched 20 and can easily be moved along the sorting machine for items being dispatched 20. In the height direction H, the assembly device 16 can be arranged at an upper end and the pulley 18 at a lower end of the loading bridge 10.

A storage area 19 can be provided in the height direction H below the loading area 10. In the storage area 19, for example, a transport container can be arranged for the acceptance of items being dispatched 3. Furthermore, in the storage area 19 a printer 19b for printing labels for the transport container 19a can be provided. The distance between the storage area 19 and the loading area 10 is preferably measured so that an upper edge of a transport container 19a to be used aligns with the floor 21 of the sorting compartment 22 in the height direction H, so that items being dispatched 3 arranged in the sorting compartment 22 can be easily transferred into the transport container 19a.

In order to be able to make the storage area 19 or the transport container 19a easily accessible from above, a flap 19c can be provided which is displayed in its open position as a dotted line in the exemplary embodiment of FIG. 3. In the closed position of the flap 19c, in which items being dispatched 3 can be moved via the flap 19c in the direction of the truck 1, the flap 19c is represented by a solid line.

The truck 1 and the sorting machine for items being dispatched 20 and optionally also the loading bridge 10 may together form a sorting system for items being dispatched 40.

FIGS. 4 to 7 show the exemplary embodiment of the previous figures, wherein different loading states of the truck 1 and the loading bridge 10 are shown.

Figure 4:
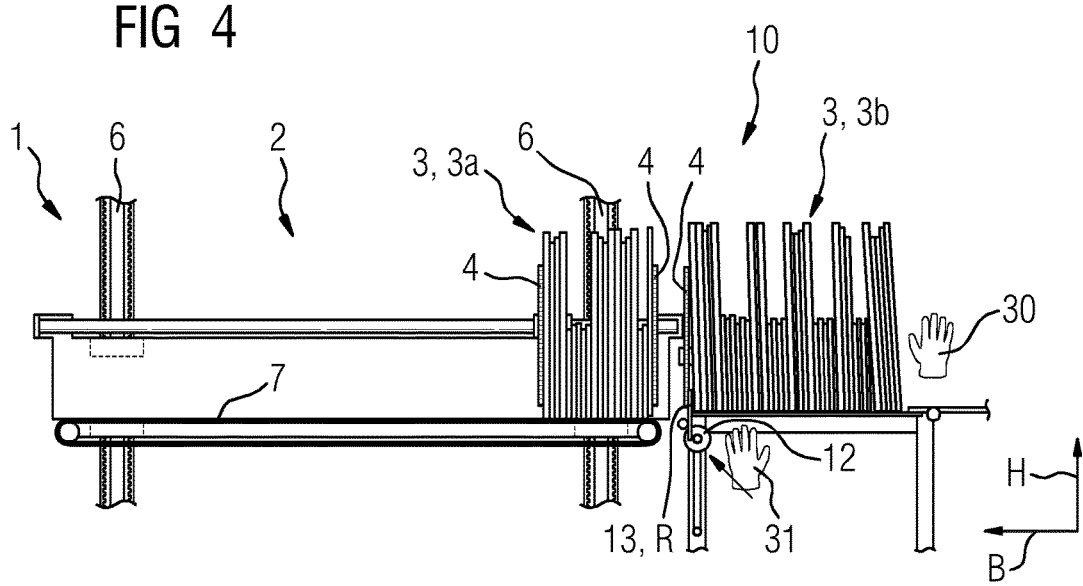
FIGS. 4-7 show the exemplary embodiments of the truck and the loading bridge of the previous figures during the loading of items being dispatched.

In FIG. 4, a first quantity 3a of items being dispatched 3 is already arranged in the receptacle 2. The first quantity 3a of the items being dispatched 3 is arranged between two stack supports 4 so that the items being dispatched 3 of the first quantity 3a cannot tip over in or contrary to the feed direction B. A second quantity 3b of items being dispatched 3 is provided on the loading bridge 10, wherein the second quantity 3b is also to be transferred into the receptacle 2. Two adjacent stack supports 4 in particular are provided such that one of the stack supports 4 is arranged on the unloading side 14 of the loading bridge 10. The other of the adjacent stack supports 4 may be arranged on the inlet side of the truck 1.

The bridging flap 13 is shown in its neutral position R and extends parallel to the height direction H so that items being dispatched 3 of the second quantity 3b are in contact with the bridging flap 13. A stack support 4 which adjoins the second quantity 3b of the item being dispatched 3 can prevent or block the tilting of the bridging flap 13 from the neutral position R into the operational position S.

An operator whose hands are shown diagrammatically 30, 31 is to displace the second quantity 3b of the item being dispatched 3 from the loading bridge 10 into the receptacle 2 in the feed direction B. For example, the operator holds the second quantity 3b with his right hand 30 so that the item being dispatched 3 cannot tip over contrary to the feed direction B.

With his other hand 31, the operator can now swivel both the adjacent stack supports 4 around a swivel axis parallel to the feed direction B so that the second quantity 3b of the item being dispatched 3 can be displaced in the feed direction B as far as the first quantity 3a.

Figure 5:
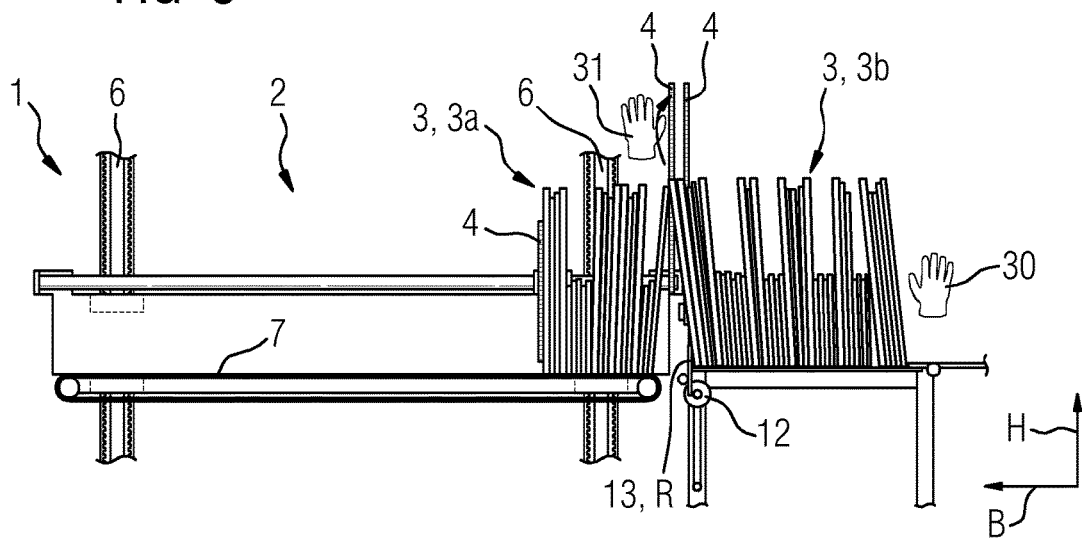

In FIG. 5 both the adjacent stack supports 4 are folded away and the item being dispatched 3 of the second quantity 3b is tipped over in the direction of the truck 1. If the operator pushes the second quantity 3b of the item being dispatched 3 with his hand 30 in the feed direction B in the direction of the truck 1, the bridging flap 13 can be tipped out of the neutral position R into the operational position S by the second quantity 3b. Alternatively, the operator can fold over the bridging flap 13 manually with his hand 31. Furthermore, activation of the driving device 12 can trigger the tilting of the bridging flap 13 into the operational position S.

Figure 6:
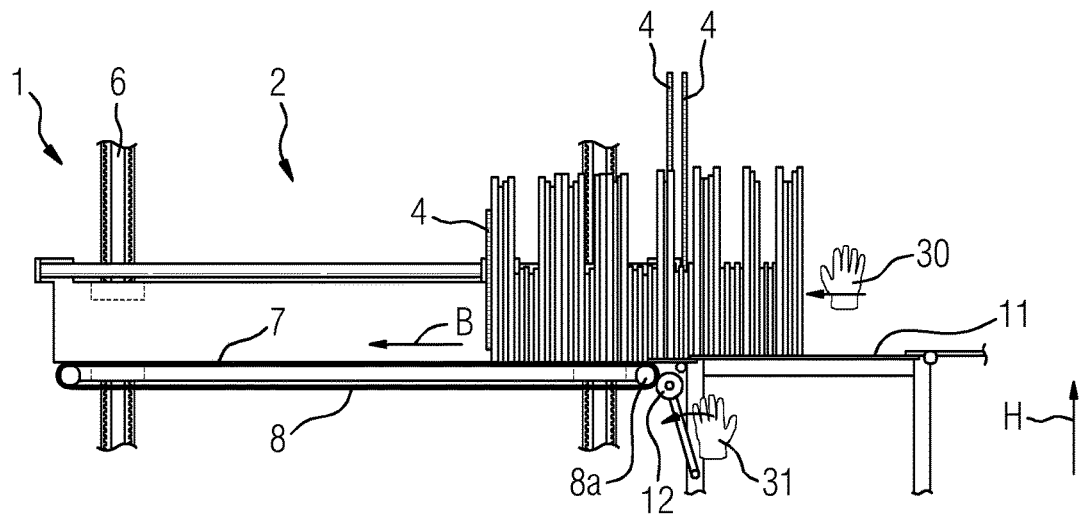

In the exemplary embodiment of FIG. 6, the operator activates the driving device 12 with his hand 31 and presses this, in particular in the area of the pulley 8a, against the conveyor belt 8. If the driving device 12 has the driven friction roller, it suffices to press the friction roller against the conveyor belt 8 to achieve movement of the floor 7 in the feed direction B. With his hand 30, the operator only needs to apply the force necessary to push the second quantity 3b of the item being dispatched 3 over the loading area 11. The first quantity 3a of the item being dispatched 3 is moved together with the floor 7 so that no frictional forces arising between the items being dispatched 3 and the floor 7 need be overcome.

Figure 7:
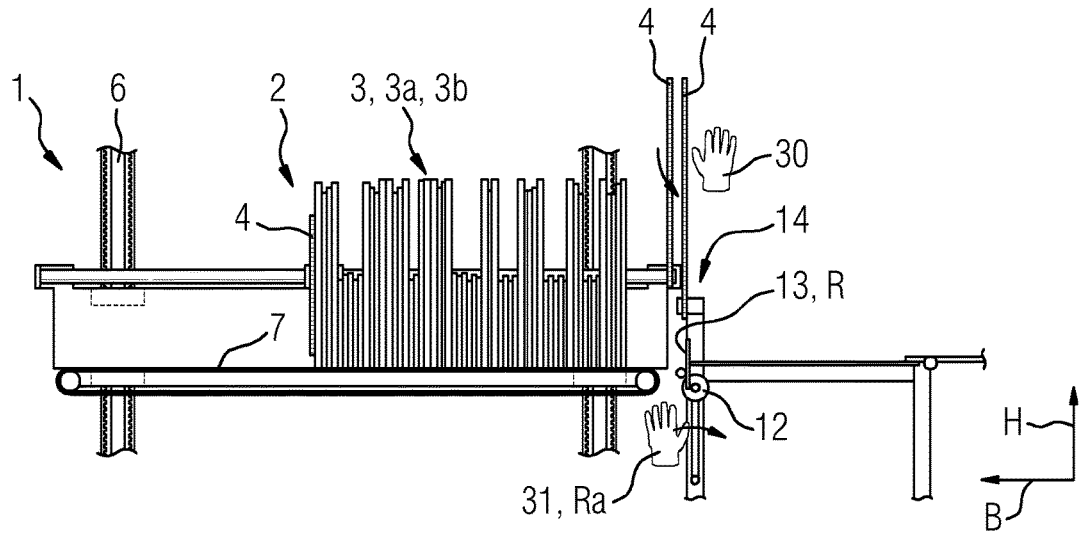

In FIG. 7 the second quantity 3b of the item being dispatched 3 is also pushed into the receptacle 2. With his hand 31, the operator can move the driving device 12 into its displayed neutral position Ra, whereby the bridging flap 13 can be moved back into its neutral position R. Alternatively, the operator can manually move the bridging flap 13 into the neutral position R. For example, using his hand 30 the operator can swivel both adjacent stack supports 4 back so that the item being dispatched 3 in the receptacle 2 cannot tip back onto the loading bridge 10.

In all the exemplary embodiments shown, the receptacles 2 can be open in design in and contrary to the feed direction B, enabling the item being dispatched 3 to be displaced into the receptacle 2 in the feed direction B and out of the receptacle 2 in the feed direction B. The item being dispatched 3 which was first pushed into the receptacle 2 can thus also be pushed out of the receptacle 2 first. Above all, if the item being dispatched 3 is to be sorted several times and for example, according to the radix sort method, the first-in-first-out sequence is necessary when loading and unloading the receptacle 2.

The invention therefore relates to a truck 1, a loading bridge 10, a sorting system for items being dispatched 40 and to a retrofit kit X for a sorting machine for items being dispatched 20. In order to ensure that an item being dispatched 3 can be removed simply from the sorting machine for items being dispatched 20 and transported to a further sorting step, according to the invention the truck 1 has a displaceable floor 7 and the loading bridge 10 has a driving device 12 for the floor 7.

Although the invention was illustrated and described in more detail by preferred exemplary embodiments, the invention is not limited by the disclosed examples and other variations may be derived therefrom by a person skilled in the art without departing from the scope of the invention.

The invention claimed is:

1. A loading bridge for loading items being dispatched from a sorting machine to a truck, the truck having at least one displaceable floor, the loading bridge comprising:
   a driving device disposed on an unloading side of the loading bridge at which the items to be dispatched are unloaded onto the truck, said driving device being configured for actuating the displaceable floor of the truck arranged at the unloading side of the loading bridge; and
   an assembly device on a loading side of the loading bridge for assembly on a machine for items being dispatched, said assembly device including at least a part of a linear guide which, when the loading bridge is mounted to the sorting machine for items being dispatched, enables a guided movement of the loading bridge along the sorting machine for items being dispatched.

2. The loading bridge according to claim 1, wherein the truck comprises a plurality of receptacles disposed one above another and configured for receiving items being dispatched from the sorting machine for the items being dispatched and wherein at least one of the receptacles has the displaceable floor, and said driving device is configured to initiate a movement in said driving device of the truck.

3. The loading bridge according to claim 1, which further comprises a pivotable bridging flap on the unloading side for extending a loading area of the loading bridge when said pivotable bridging flap is in an operational position.

4. The loading bridge according to claim 3, wherein said bridging flap is disposed above said driving device in the operational position thereof.

5. A retrofit kit for a sorting machine for items being dispatched, the retrofit kit comprising a truck with a displaceable floor, and a loading bridge according to claim 1.

* * * * *